Oct. 29, 1946.  H. A. STORCH  2,410,312
MOLDING APPARATUS
Filed July 15, 1944
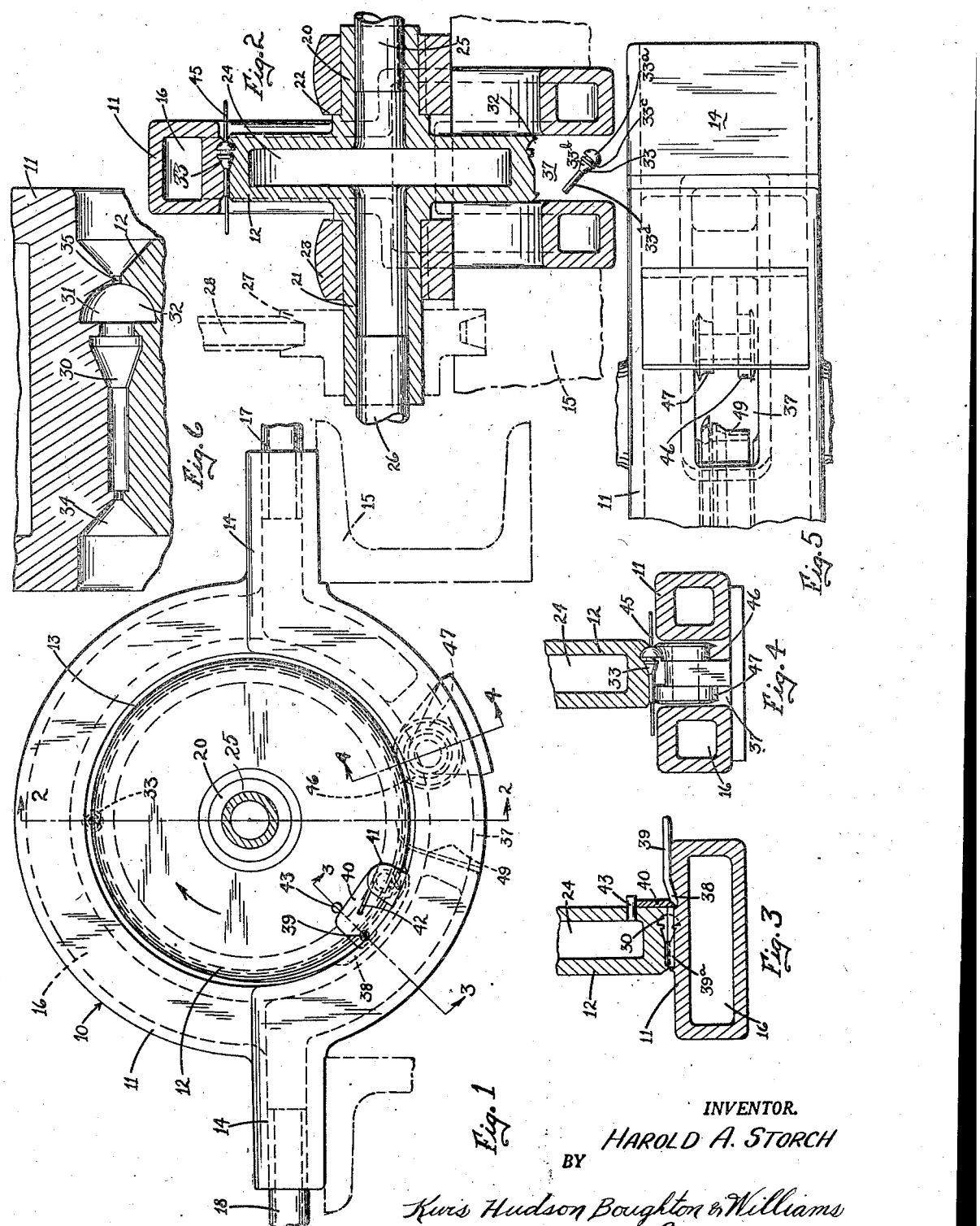
INVENTOR.
HAROLD A. STORCH
BY
Kurs Hudson Boughton & Williams
ATTORNEYS Patented Oct. 29, 1946

2,410,312

UNITED STATES PATENT OFFICE 2,410,312

MOLDING APPARATUS

Harold A. Storch, Fairview Village, Ohio

Application July 15, 1944, Serial No. 545,114

5 Claims. (Cl. 18—9)

This invention relates to the molding of articles from plastic material or materials in a plastic state and aims to provide a novel apparatus by which molded articles, and particularly articles of revolution, can be rapidly and economically produced.

Another object of this invention is to provide a novel molding apparatus of this character, involving the use of a grooved mold member and the step of rolling a body of material in the groove for molding the material to article form.

A further object of the invention is to provide novel molding apparatus of the character mentioned, in which complemental grooves of a pair of mold members form a mold recess of a cross-sectional shape to correspond substantially with the profile of the article to be produced and such mold members are relatively movable in the direction of the grooves for rolling plastic material to article shape and advancing the article along the recess.

Still another object of the present invention is to provide novel molding apparatus of the character referred to, having means for severing bodies or blanks from plastic stock in strip form preliminary to the molding operation and means for trimming the articles at or near the end of the molding operation.

Yet another object of this invention is to provide novel molding apparatus of this character, in which the mold comprises relatively rotatable ring and drum members and is heated or cooled so as to effect a curing of the material during the molding thereof.

The invention can be further briefly summarized as consisting in certain novel combinations and arrangements of parts, hereinafter described and particularly set out in the appended claims.

In the accompanying sheet of drawings,

Fig. 1 is a side elevation of molding apparatus embodying the present invention.

Fig. 2 is a vertical sectional view taken through the apparatus as indicated by line 2—2 of Fig. 1.

Fig. 3 is a partial sectional view showing the feed opening and the severing means for the strip stock, the view being taken on line 3—3 of Fig. 1.

Fig. 4 is a partial sectional view showing the means for trimming the molded articles, the view being taken on line 4—4 of Fig. 1.

Fig. 5 is a partial bottom plan view showing the discharge opening for the molded articles, and Fig. 6 is a partial transverse sectional view on an enlarged scale showing the complemental grooves of the cooperating mold members and the mold recess formed by such grooves.

Proceeding with a more detailed description of the invention and referring to the particular embodiment illustrated in the drawing, I show molding apparatus 10 comprising a pair of cooperating stationary and movable mold members 11 and 12. The stationary mold member 11 is in the form of a ring which provides a frame for the apparatus and has a substantially circular central opening 13 therein. The movable mold member 12 is in the form of a drum which is located in the circular opening 13 of the stationary member 11 and is mounted for rotation as will be presently described. The ring member 11 is provided with oppositely extending projections 14 by which it may be mounted on a suitable support or foundation 15. The ring member is of a hollow construction so as to provide therein a passage or chamber 16 for a curing or treating medium which usually will be a heating medium, such as steam, although it can be a cooling medium depending upon the requirements of the material being molded. Usually the material will be a non-metallic material such as rubber or a rubber composition which is cured by heat and the medium will therefore be referred to as a heating medium. Such heating medium can be circulated through the passage 16 by means of supply and exhaust pipes or conduits 17 and 18 which are connected with such passage through the oppositely extending projections 14.

The drum constituting the movable mold member 12 has a pair of oppositely extending co-axial projections or shafts 20 and 21 thereon and which are journaled in suitable bearings 22 and 23 so as to mount the drum for rotation about the common axis of the shafts 20 and 21. The bearings 22 and 23 are located on opposite sides of the stationary mold member 11 and may be suitably mounted on the support or foundation 15. The drum 12 is also of a hollow construction so as to provide therein a recess or chamber 24 to which some of the above-mentioned curing or heating medium can be supplied. The shafts 20 and 21 are hollow and provide supply and discharge passages which communicate with the chamber 24 and into which supply and discharge pipes or conduits 25 and 26 for the curing medium extend, as shown in Figs. 1 and 2 of the drawing. The drum 12 can be rotated by supplying torque thereto through the shaft 21 and this can be accomplished manually or by the use of any suitable power means connected therewith as by means of the pulley 27 and the driving belt 28.

The present invention involves the use of a mold recess or chamber 30 of a cross-sectional shape corresponding substantially with the profile of the article to be produced. The mold chamber 30 is formed by cooperating complemental mold grooves 31 and 32 formed respectively in the adjacent co-extending faces of the stationary and movable mold members 11 and 12. The molding apparatus herein disclosed can be used in producing a number of different articles from rubber or rubber-like material or from any other moldable plastic material. In this instance and merely by way of example, the method and apparatus are being used for the production of small button-like rubber articles 33 which are commonly called bumpers and are used in large quantities in automobile body work for preventing metal-to-metal contact between various parts of the vehicle.

As shown in the drawing, the bumpers 33 are rivet-like articles having a rounded head 33a and a tapered stem or shoulder portion 33b, with a locking groove 33c located between such head and tapered stem. The bumper 33 also includes a tail 33d of relatively reduced size which extends from the tapered stem 33b. As is understood by those skilled in automobile body work, these bumpers are mounted in openings of sheet metal parts by inserting the tail 33d through the opening and pulling the tapered stem 33b into or through the opening up to the point of the locking groove 33c. The edge of the sheet metal body surrounding the opening engages in the locking groove 33c to retain the bumper in position with the head 33a thereof forming an insulating body and bumper element.

The grooves 31 and 32 in the adjacent faces of the stationary and movable mold members 11 and 12 are of a shape or contour corresponding with the shape or profile of the article 33 to be produced, that is to say, each of these grooves includes a section corresponding with the rounded head 33a, a section corresponding with the taper stem 33b and a section corresponding with the tail 33d. The mold members are constructed and arranged so that the grooved faces thereof operate in relatively close relation to each other and form the annularly extending mold chamber 30. It is necessary that there be some clearance between the movable and stationary mold members such as the annularly extending clearance spaces 34 and 35 shown in the drawing but which may vary in width according to the requirements of the particular molding apparatus being used or material being molded.

The lower portion of the stationary mold member 11 is of a relatively wider construction than the upper portion thereof as can be readily seen from Fig. 2 of the drawing. This relatively wider construction for the lower portion of this mold member enables the same to be provided with a discharge opening 37 through which the molded articles can drop by gravity from the apparatus. At a point adjacent the discharge opening 37, the stationary mold member 11 is also provided with a feed opening 38 leading into the annular mold chamber 30 and through which the leading end of a strip or stream 39 of rubber or other suitable plastic stock can be inserted. Sections or blanks having an appropriate length and volume of material, such as the blank 39a shown in Fig. 3 can be severed from the leading end of the strip 39 as by means of a cutter 40. Such a cutter can be pivotally mounted on a projection or boss 41 of the stationary mold member 11 and can be normally held in a lifted condition by a torsion spring 42 so as to permit the insertion of the leading end of the strip 39 into the feed opening. The cutter 40 can be actuated by any appropriate means such as by a pin 43 projecting from the mold member 12 and engageable with the cutter during the rotational movement of this mold member. The cutter can, of course, be omitted and previously cut or prepared lengths of stock can be inserted in succession through the feed opening 38.

In the operation of the apparatus herein disclosed, the blanks 39a which are severed from the leading end of the strip of stock 39 are subjected to a rolling operation in the mold chamber 30 by the rotation of the drum 12 in the ring member 11. During such relative movement between the movable and stationary mold members each blank or body of stock is rolled and kneaded in the mold chamber 30 and is subjected to pressure therein causing the material to be distributed into and substantially fill the complemental grooves of the mold chamber at the particular location of the blank in such chamber. Since the material is being rolled along the mold recess it assumes and retains a round or cylindrical shape, that is to say, it becomes an article of revolution having a profile corresponding with the shape or profile defined by the complemental grooves. The kneading and working to which the material is subjected causes such material to be firmly compacted which renders the article dense and strong and expels air bubbles therefrom which would otherwise make the article porous and weak. The resulting article produced by the molding operation is of a homogeneous nature and is of a strong and durable character usually having a high tensile strength.

The mold can be heated or cooled to the desired extent during the molding operation, by supplying appropriate medium to the passages of the mold members 11 and 12 as above explained, so as to obtain a desired curing, hardening or other treatment of the stock being worked. The extent to which the mold is heated or cooled during the molding operation will depend on the requirements and characteristics of the particular plastic material being used and the characteristics desired in the articles being produced.

As the molding operation progresses during the rotation of the drum 12 within the ring member 11 the articles 33 travel around the mold recess 30 in a direction away from the feed opening and toward the discharge opening 37 or, in other words, advance along the mold recess in a clockwise direction as seen in Fig. 1. The pressure to which the stock is subjected during the molding operation causes any excess material to be squeezed from the mold recess as flash 45 through the clearance spaces 34 and 35. Since the articles being formed are articles of revolution the flash 45 is usually in the form of threads or strings of plastic material extending from the head and tail of the article being formed, as shown in Figs. 2 and 4.

It is desirable to trim the flash 45 from the articles 33 and in accordance with the present invention such trimming is accomplished before the articles arrive at the discharge opening 37. For this purpose I provide the apparatus with a trimming means comprising a pair of trimming rolls 46 and 47 which are rotatably mounted on the stationary mold member 11 just ahead of the discharge opening 37. These trimming rolls have peripheral cutting edges which cooperate with the drum 12 so as to sever the flash portions from the articles as the articles pass between the drum and the trimming rolls. The trimming rolls are driven by the drum 12 by the engagement of their cutting portions therewith.

In the event that any of the articles 33 tend to adhere to the surface of the drum 12 at the end of the molding operation they can be dislodged therefrom by means of a stripper 49 provided in the discharge opening 37. This stripper may be a finger-like member mounted on the stationary mold member 11 so as to extend into adjacent relation to the surface of the movable mold member 11 for scraping or pushing the molded articles from the latter should this be necessary to cause such articles to drop freely through the discharge opening 37.

The extent to which the material is subjected to compression during the molding operation will depend upon the characteristics of the material being worked and the requirements of the articles being produced. In some cases, the pressure applied will be only sufficient to cause the material to be properly distributed in the mold recess to fill out the profile of the article being formed. In other cases, additional pressure may be necessary to obtain the desired characteristics or qualities in the articles. Any desired amount of pressure can be obtained by imparting an appropriate taper to the groove of the stationary mold member 11 such that the depth of the groove decreases progressively and subjects the article to increased pressure as the article is rolled and advanced along the mold recess 30.

From the foregoing description and accompanying drawing it will now be readily understood that I have provided an improved apparatus for rapidly and economically producing molded articles from plastic stock.

While I have illustrated and described my molding apparatus in considerable detail, it will be understood, of course, that I do not wish to be correspondingly limited but regard my invention as including all changes and modifications coming within the spirit of the invention and the scope of the appended claims.

Having thus described my invention I claim:

1. In apparatus for molding from plastic material elongated articles of revolution of the kind having a body which includes stem and shoulder portions, a ring member having a circumferential groove therein, a drum member rotatable in said ring member and also having a circumferential groove therein, the grooves of said ring and drum members cooperating to define a circumferentially extending mold chamber having a cross-sectional shape which is elongated transversely of the groove and corresponds substantially with the profile of the article to be produced, and said grooves having connected coextending portions of different depths spaced transversely of the grooves for forming the stem and shoulder portions of the articles means for rotating said drum member for rolling a body of said material in said chamber to shape the body to article form, said ring member having a feed opening disposed laterally of its groove and extending in the direction of the axis of the drum and communicating with said chamber at one point thereof for introducing said material in strip form and said ring also having a discharge opening communicating with said chamber at another point thereof for the delivery of the molded articles, a cutter pivotally mounted on said ring member for strip-cutting movement transversely of said feed opening, means on said drum member and engageable with said cutter for producing said strip-cutting movement, and a trimming means rotatably mounted on said ring member adjacent said discharge opening and having a cutting portion engaging said drum member for trimming the molded articles as they approach the discharge opening.

2. In apparatus for molding plastic material, a ring member having a circumferential groove therein, a drum member rotatable in said ring member and also having a circumferential groove therein, the grooves of said ring and drum members cooperating to define a circumferentially extending mold chamber of a cross-sectional shape corresponding substantially with the profile of the article to be produced, said ring member having a feed opening communicating with said chamber at one point thereof for introducing said material in strip form and having a discharge opening communicating with said chamber at another point thereof for the delivery of the molded articles, means for rotating said drum member for rolling a body of said material in said chamber to shape the body to article form and advance the same toward said discharge opening, a pivoted cutter adjacent to and movable transversely of said feed opening for severing a body of said material from a strip being fed, a spring acting on said cutter for moving the same in a direction to uncover said feed opening, and projecting means on said drum member and engageable with said cutter during rotation of the drum member for moving the cutter in a direction to sever the strip.

3. In apparatus for molding plastic material, a ring member having a circumferential groove therein, a drum member rotatable in said ring member and also having a circumferential groove therein, the grooves of said ring and drum members cooperating to define a circumferentially extending mold chamber of a cross-sectional shape corresponding substantially with the profile of the article to be produced, said ring member having a feed opening communicating with said chamber at one point thereof for introducing said material and having a discharge opening communicating with said chamber at another point thereof for the delivery of the molded articles, means for rotating said drum member for rolling a body of said material in said chamber to shape the body to article form and advance the same toward said discharge opening, said drum and ring members having cooperating portions defining a clearance space which communicates with said mold chamber, and trimming means rotatably mounted on said ring member and having a cutting portion engaging said drum member adjacent said discharge opening for trimming from the molded articles excess material which is displaced through said clearance space.

4. In apparatus for molding plastic material, a ring member having a circumferential groove therein, a drum member rotatable in said ring member and also having a circumferential groove therein, the grooves of said ring and drum members cooperating to define a circumferentially extending mold chamber of a cross-sectional shape corresponding substantially with the profile of the article to be produced, said ring member having a feed opening communicating with said chamber at one point thereof for introducing said material in strip form and having a discharge opening communicating with said chamber at another point thereof for the delivery of the molded articles, means for rotating said drum member for rolling a body of said material in said chamber to shape the body to article form and advance the same toward said discharge opening, a cutter movably mounted on said ring member adjacent said feed opening for severing bodies of material in succession from a strip being fed, and means on said drum for actuating said cutter.

5. In apparatus for molding plastic material, a ring member having a circumferential groove therein, a drum member rotatable in said ring member and also having a circumferential groove therein, the grooves of said ring and drum members cooperating to define a circumferentially extending mold chamber of a cross-sectional shape corresponding substantially with the profile of the article to be produced, said ring member having a feed opening communicating with said chamber at one point thereof for introducing said material in strip form and having a discharge opening communicating with said chamber at another point thereof for the delivery of the molded articles, means for rotating said drum member for rolling a body of said material in said chamber to shape the body to article form and advance the same toward said discharge opening, and trimming rolls mounted on said ring member and cooperating with said drum for trimming the molded articles as they approach said discharge opening.

HAROLD A. STORCH.